United States Patent
Olszewski et al.

(10) Patent No.: US 9,280,525 B2
(45) Date of Patent: Mar. 8, 2016

(54) METHOD AND APPARATUS FOR FORMING A STRUCTURED DOCUMENT FROM UNSTRUCTURED INFORMATION

(75) Inventors: Marek Olszewski, San Francisco, CA (US); Stylianos Sidiroglou, Cambridge, MA (US); Jason Ansel, Cambridge, MA (US); Marc Piette, San Francisco, CA (US); Rene Reinsberg, San Francisco, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 512 days.

(21) Appl. No.: 13/605,051

(22) Filed: Sep. 6, 2012

(65) Prior Publication Data

US 2013/0067319 A1  Mar. 14, 2013

Related U.S. Application Data

(60) Provisional application No. 61/531,498, filed on Sep. 6, 2011.

(51) Int. Cl.
| | |
|---|---|
| *G06F 17/00* | (2006.01) |
| *G06F 17/21* | (2006.01) |
| *G06F 17/30* | (2006.01) |
| *G06F 17/27* | (2006.01) |

(52) U.S. Cl.
CPC ........ *G06F 17/218* (2013.01); *G06F 17/30705* (2013.01); *G06F 17/277* (2013.01)

(58) Field of Classification Search
CPC ..................................................... G06F 17/277
USPC ........................................................ 715/234
See application file for complete search history.

(56) References Cited

U.S. PATENT DOCUMENTS

| | | | |
|---|---|---|---|
| 7,542,958 B1 * | 6/2009 | Warren et al. .................... | 706/48 |
| 2004/0006742 A1 * | 1/2004 | Slocombe ...................... | 715/513 |
| 2010/0100607 A1 * | 4/2010 | Scholz et al. .................. | 709/219 |
| 2010/0274770 A1 * | 10/2010 | Gupta et al. ................... | 707/688 |
| 2012/0158724 A1 * | 6/2012 | Mahadevan et al. .......... | 707/737 |

OTHER PUBLICATIONS

Dejean et al., "A System for Converting PDF Documents into Structured XML Format," 2006, pp. 129-140.*

* cited by examiner

*Primary Examiner* — Kavita Padmanabhan
*Assistant Examiner* — Andrew McIntosh
(74) *Attorney, Agent, or Firm* — Quarles & Brady LLP

(57) ABSTRACT

Illustrative embodiments improve upon prior machine learning techniques by introducing an additional classification layer that mimics human visual pattern recognition. Building upon classification passes that extract contextual information, illustrative embodiments look for hints of high-level semantic categorization that manifest as visual artifacts in the document, such as font family, font weight, text color, text justification, white space, or CSS class name. An improved lightweight markup language enables display of machine-categorized tokens on a screen for human correction, thereby providing ground truths for further machine classification.

20 Claims, 8 Drawing Sheets

```
= Price List Name

== Section Header
choose:
Large
Med

Junk/Comment

% Section text

Spring Roll
Our famous Vietnamese spring rolls
5.0

Panang Curry
Great curry from Malaysia
choose:
Small: 8.0
Large: 9.0
choose:
chicken: +2
beef: +3
shrimp: +3
```

FIG. 8

METHOD AND APPARATUS FOR FORMING A STRUCTURED DOCUMENT FROM UNSTRUCTURED INFORMATION

PRIORITY

This application claims the benefit of U.S. Provisional Application No. 61/531,498, filed Sep. 6, 2011 and having the same title. The above-referenced provisional application is hereby incorporated by reference in its entirety.

TECHNICAL FIELD

The invention generally relates to data acquisition and, more particularly, to producing structured information/documents from unstructured information/documents.

BACKGROUND ART

Search engines are the current user interface to the Internet. Users often rely heavily on the ability of search engines to provide relevant results. Semantic search aims to improve upon traditional search algorithms, such as Google's Page Rank, by incorporating semantics (meaning), to produce more relevant search results by understanding search intent and contextual meaning.

It is known to classify documents by their contents, if the contents are structured. For example, U.S. Pat. No. 5,676,710 to Lewis teaches a method and apparatus for training a text classifier. Documents are classified with respect to pre-defined classes in a supervised setting, where the documents are first machine annotated, then finally classified using a combination of supervised and unsupervised learning. Similarly, U.S. Pat. No. 7,756,800 to Chidlovskii teaches a method and system for classifying documents based on instances of various structured elements within them.

However, to enable semantic search for unstructured documents, it is essential to have tools that can extract structured data from these documents. Unfortunately, extracting meaning from documents that do not provide annotations is an extremely challenging task. This task is particularly challenging, for example, when extracting semantic information for a restaurant menu provided as PDF document or an image. Without semantic annotations, it is difficult to determine which text entries refer to section titles, dish names, descriptions, or specific annotations.

Previous work in this area known to the inventors has relied on supervised learning techniques that attempt to create models that can classify items based on carefully annotated data sets. U.S. Pat. No. 7,756,807 to Komissarchik et al. teaches methods that extract facts from unstructured documents, such as a web page. These facts include the title of the page, an article body, section headers, names of people and companies, and so on. Undesirably, this approach suffers from many false positives and false negatives (e.g., misclassifying items as sections) as it relies solely on content and context provided by the extracted text. In fact, due to the varying nature of documents, such as menus, techniques that rely solely on automated machine learning techniques suffer from some form of false positives and false negatives.

To the extent that information can be extracted from such documents, it may be stored in an intermediate representation. For example, U.S. Pat. No. 7,685,083 to Fairweather describes a system for converting unstructured data into a normalized form. The data are tied to a system ontology that can be 'mined' for information.

SUMMARY OF VARIOUS EMBODIMENTS

As shown in FIG. 1, illustrative embodiments improve upon prior machine learning techniques by introducing an additional classification layers that mimics human pattern recognition. Building upon classification passes that extract contextual information, illustrative embodiments look for hints that manifest in visual artifacts in the document that indicate high-level semantic categorization.

For example, after illustrative embodiments identify one component as a possible restaurant menu item name, they identify the visual characteristics of that item and look for similar visual patterns in the document. Thus, if a menu item name is displayed with an 11 point courier font in grey, other similarly displayed items are likely to belong to the same semantic category. Illustrative embodiments can correctly identify a subset of the contextual information, as the visual cues will provide the appropriate hints for the rest of the text where the confidence score might otherwise lead to false positives and false negatives.

Therefore, there is provided in a first embodiment a method of forming a structured document from an unstructured input document. The method includes a number of steps, and begins by receiving the input document from a data communication network and storing the received input document in a storage system. Next, in a first computer process, the method extracts a plurality of textual tokens from the input document, each extracted token having a visual style. Then, in a second computer process, the method applies a content classifier to the plurality of tokens to produce, for each token therein, a first probability distribution of the given token with respect to a plurality of textual classes. In a third computer process, the method redistributes the probabilities of each token, based on the classification of its surrounding tokens in context, thereby producing a second probability distribution of the given token with respect to the plurality of textual classes. In a fourth computer process, the method applies a visual style classifier to each token based on its visual style, thereby producing a third probability distribution of the given token with respect to the plurality of textual classes. Next, the method calls for determining a classification for each token into one of the plurality of textual classes as a function of the second and third probability distributions. Finally, the method requires forming a structured document from the plurality of classified tokens in the storage system.

Various modifications may be made on the first embodiment. For example, the input document may include a markup language, and extracting the plurality of textual tokens comprises parsing the markup language. If the input document comprises an image, extracting the plurality of textual tokens may include detecting a column in the image, optionally correcting the perspective of the image, super-sampling the image, or performing optical character recognition on the image. The visual style may be a font name, font family, font weight, font size, text color, vertical alignment, horizontal alignment, text justification, text indentation, capitalization type, link type, amount of surrounding white space, or CSS class name. The style classifier does not have to classify any token based on a visual style that is not found in the input document. If the input document is an HTML page, the style classifier does not have to classify any token based on a relationship between HTML tags. In illustrative embodiments, the input document is a restaurant menu, although other documents may be used in accordance with the disclosure set forth herein. In accordance with a supervised learning environment, the method may include displaying the tokens on a video display, receiving an indication from an individual viewing the video display that a token has been misclassified, and reclassifying the token into a different textual class according to the indication.

Illustrative embodiments of the invention are implemented as a computer program product having a computer usable medium with computer readable program code thereon. The computer readable code may be read and utilized by a computer system in accordance with conventional processes.

The invention may be embodied in a system to carry about these methods. Within the system, the various classifiers may be implemented as Bayesian filters. Moreover, the visual style classifier may be trained on the probability distribution output by the context classifier, rather than a pre-defined corpus.

BRIEF DESCRIPTION OF THE DRAWINGS

The foregoing features of embodiments will be more readily understood by reference to the following detailed description, taken with reference to the accompanying drawings, in which:

FIG. 8 shows an example of a lightweight markup language used in connection with human correction of machine-classified tokens.

DESCRIPTION OF ILLUSTRATIVE EMBODIMENTS

Definitions. As used in this description and the accompanying claims, the following terms shall have the meanings indicated, unless the context otherwise requires:

"Text" refers to a sequence of characters, each character being a member of an alphabet of symbols.

A "document" may be any digital file containing text. A document may be, for example: a text file having ASCII or Unicode characters; a word processing file; a spreadsheet; a file encoded in HTML, XML, or another markup language; an image of text that is encoded according to a JPEG, GIF, or other image format; or a file that is encoded according to PDF, PostScript, or another file format that may be rendered into an image of text.

A "visual style" of text is any visually distinctive property of the text, and may include, without limitation, any or all of: a font name, a font family, a font weight, a font size, a text color, a vertical or horizontal alignment with respect to other text, a text justification, a text indentation, a capitalization type, a link type, and a Cascading Style Sheet (CSS) class name.

This description primarily discusses illustrative embodiments as being implemented in conjunction with restaurant menus. It should be noted, however, that discussion of restaurant menus simply is one example of many different types of unstructured data items that apply to illustrative embodiments. For example, various embodiments may apply to unstructured listings from department stores, salons, health clubs, supermarkets, banks, movie theaters, ticket agencies, pharmacies, taxis, and service providers, among other things. Accordingly, discussion of restaurant menus is not intended to limit various embodiments of the invention.

Figure 1:
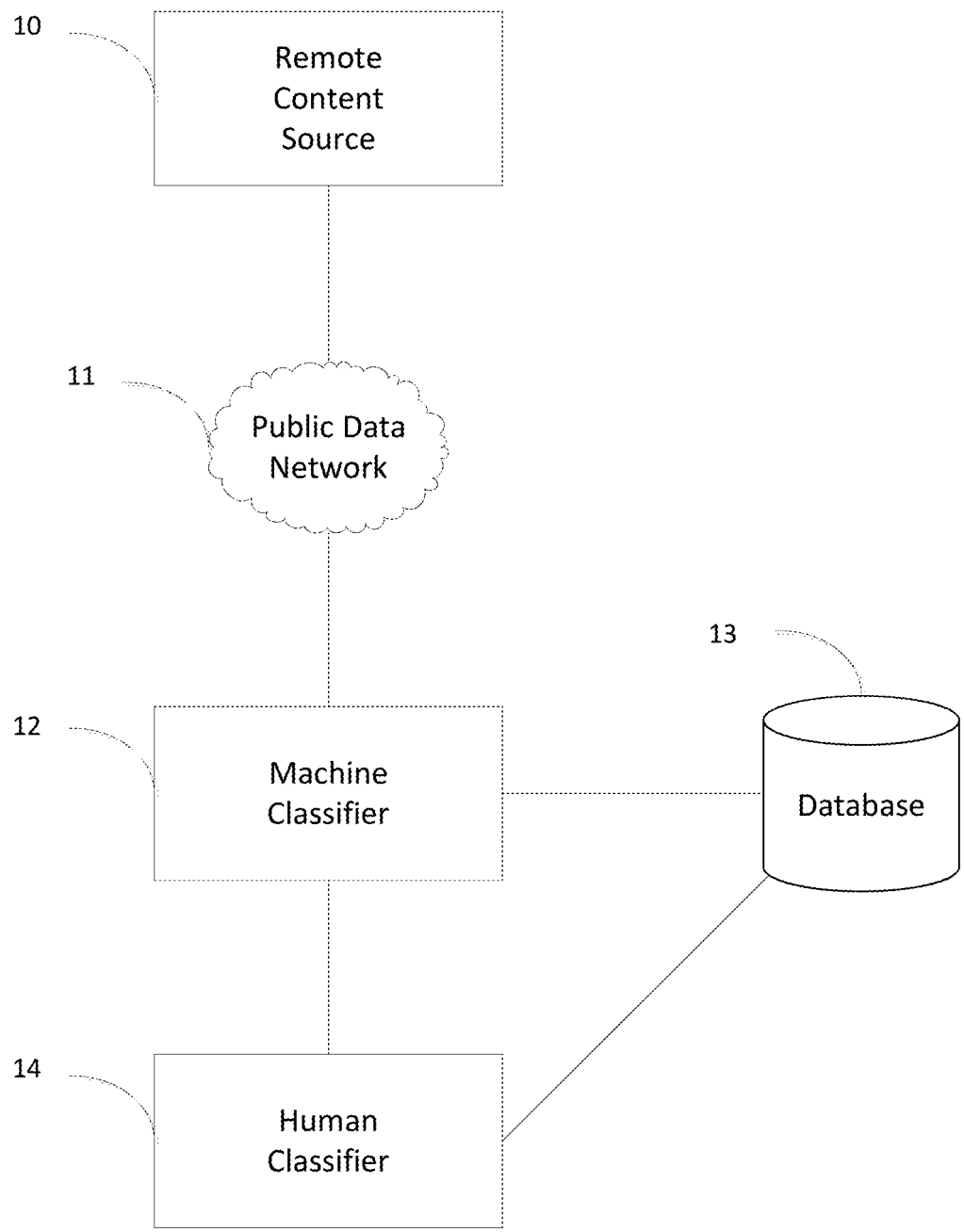
FIG. 1 shows a schematic view of an environment in which an embodiment of the invention may operate.

FIG. 1 shows a schematic view of an environment in which an embodiment of the invention may operate. The environment includes one or more remote content sources, such as a standard web server 10 on which is an input document from which features are to be extracted. The determination of the network address of such a remote content source, and how to access the input document, are described below in connection with FIG. 2. The remote content sources are connected, via a data communication network 11 such as the Internet, to a machine classifier 12 in accordance with an embodiment of the invention. As described in more detail below, the machine classifier 12 extracts relevant features from input documents for later presentation to an end user. The relevant features are stored in a database 13. Optionally, the extracted features are presented to a human classifier 14, such as an individual sitting at a computer terminal. The human classifier 14 may evaluate the accuracy of the machine classification and make corrections to features that were misclassified by the machine classifier.

In various embodiments, the remote content sources 10 may be any conventional computing resources accessible over a public network. The network 11 may be the Internet, or it may be any other data communications network that permits access to the remote content sources. The machine classifiers 12 may be implemented as discussed below in connection with FIGS. 3-5. The database 13 may be any database or data storage system known in the art that operates according to the limitations and descriptions discussed herein. A human classifier 14 is any individual or collection of individuals as described below in connection with FIG. 6 that operates to correct misclassified features extracted from an input document.

Machine Classification

Figure 2:
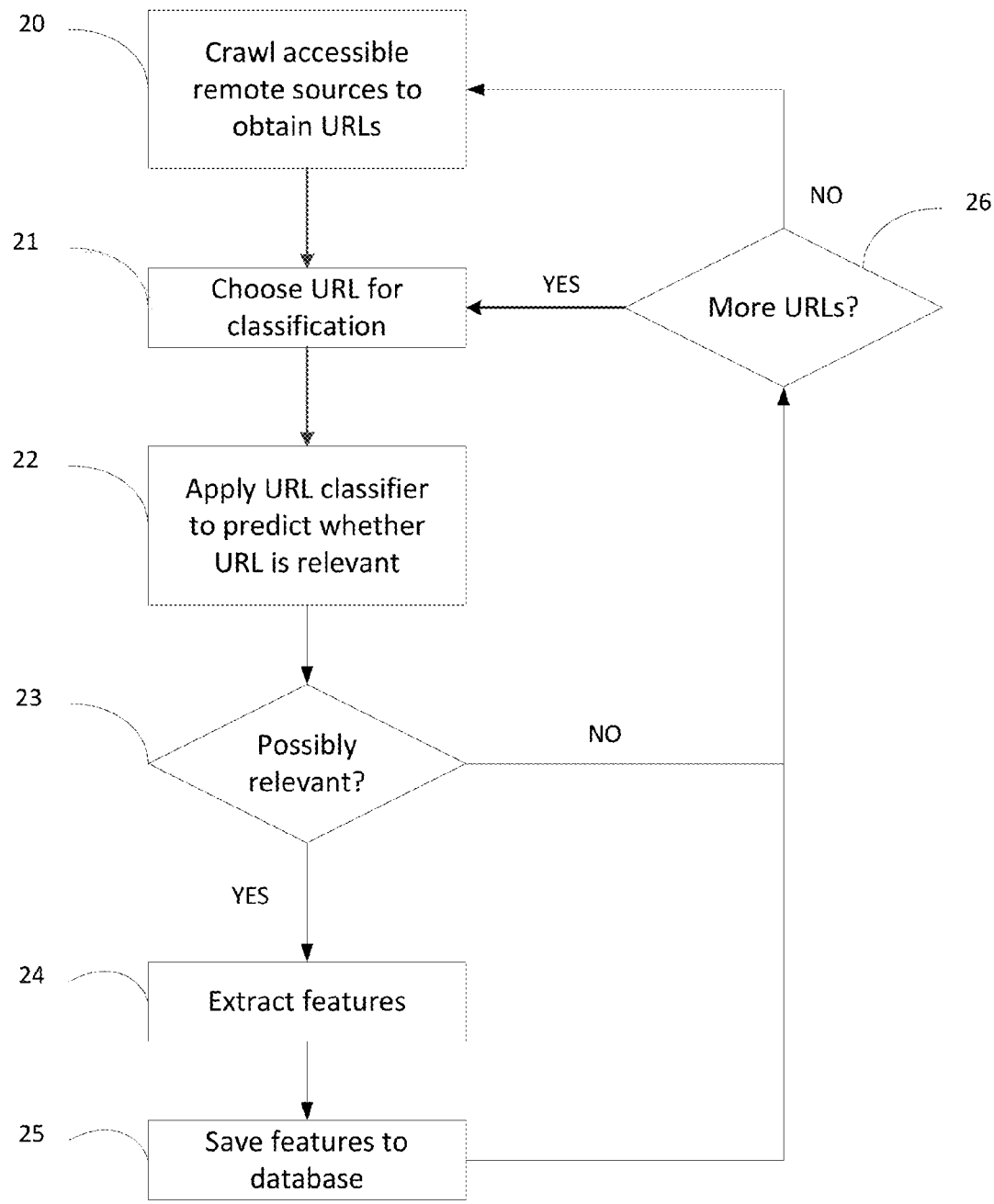
FIG. 2 is a flow diagram of processes that occur in the environment of FIG. 1 in accordance with an embodiment.

FIG. 2 is a flow diagram of processes that occur in the environment of FIG. 1 in accordance with an embodiment. In a first process 20, the embodiment crawls accessible remote sources to obtain lists of URLs. This may be done using techniques known in the art. For example, in the context of locating restaurant menus, this first process identifies menu sources. To automate the process, illustrative embodiments use a custom distributed web crawler that employs several initial input sources (e.g., Google, Bing, Restaurant lists) to seed its index. By using publicly available lists and search engine APIs, crawling is focused to a targeted geographically constrained set of web pages, significantly facilitating the ability to efficiently scale menu discovery.

In another process 21, the embodiment chooses one of the URLs for classification in a URL classifier. In process 22, the embodiment applies the URL classifier to each document to predict whether it is relevant to the application at hand. In a process 23, the embodiment chooses whether the URL is possibly relevant. If not, the embodiment processes another URL. In process 26, the embodiment determines if more URLs are available. If so, the embodiment returns to process 21 to select one for classification. If no more URLs remain, then the embodiment determines to return to process 20 to crawl more remote sources.

If, however, a given URL is possibly relevant, than in process 24 the embodiment extracts relevant features from the document referenced by the URL. This process may include fetching additional content associated with the URL, including an entire input document (as opposed to just header information). Once the document has been fetched, its contents are translated into an intermediate representation, as described below in connection with FIG. 3. Then a multistage classification algorithm is applied, as described below in connection with FIGS. 4-5. The result of the classification algorithm is a collection of classified, extracted features, which are saved to a database in process 25 using techniques known in the art. At this point, the embodiment has finished processing the given URL, and returns to process 26 to begin again with a new URL. At a later point, the results of these processes may be reviewed by a human, in accordance with another embodiment of the invention described below in connection with FIG. 6.

Figure 3:
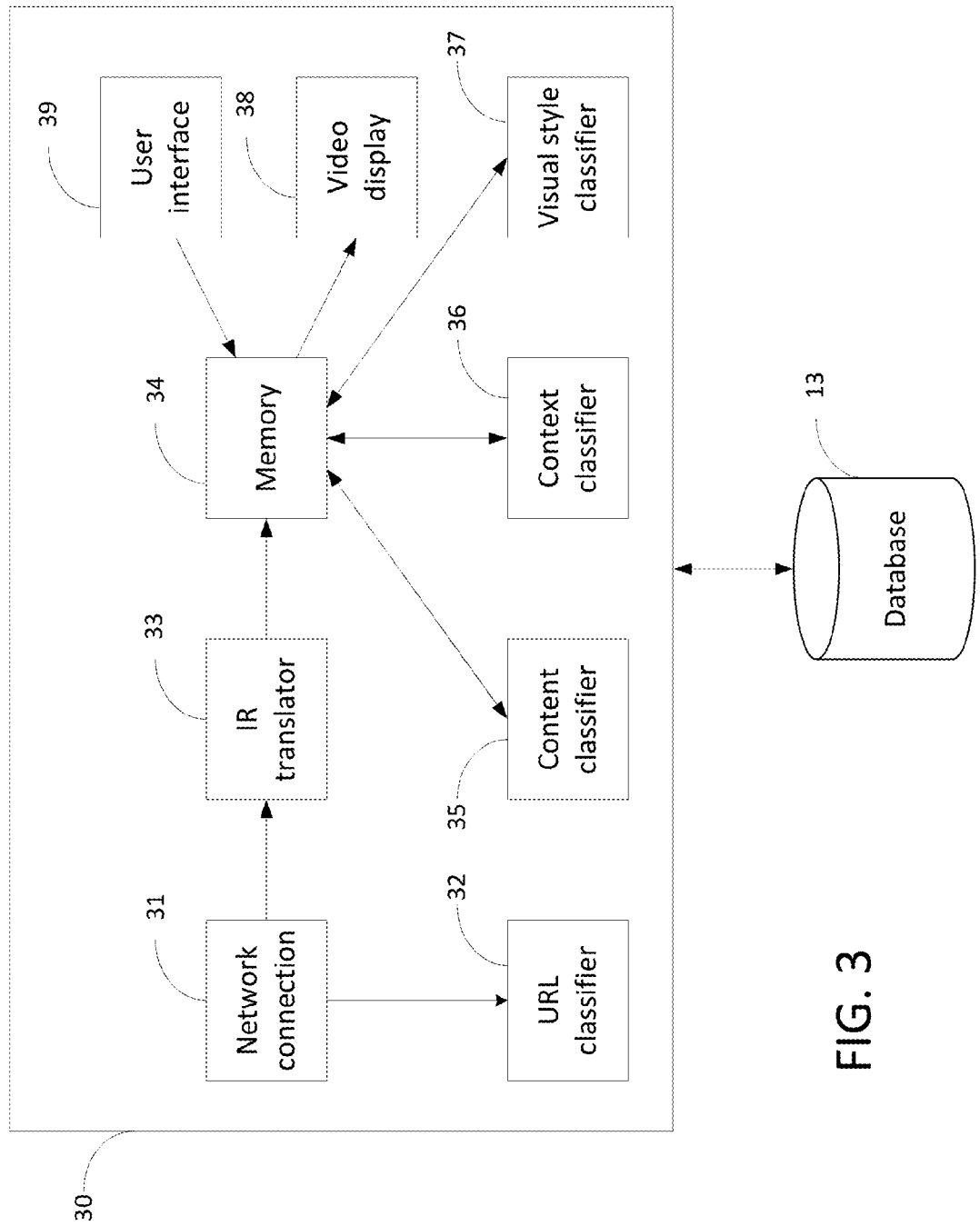
FIG. 3 shows a machine classifier according to an embodiment of the invention.
Figure 4:
FIG. 4 shows a representation of an example image input document.

FIG. 3 shows an exemplary machine classifier according to an embodiment of the invention. The machine classifier 30 includes a network connection 31 to connect to the public data network 11 so as to retrieve input documents and URLs for each of them. The network connection 31 may be, for example, an Ethernet port or any other such device known in the art. The machine classifier also includes a URL classifier 32 that determines whether a given document is potentially relevant. If a given URL appears to be relevant, its linked content is downloaded as an input document. The textual contents and their styles are extracted from the input document into an intermediate representation (IR) by an IR translator 33. Once normalized, these textual contents are stored in a storage system 34, which may be a conventional volatile or non-volatile computer memory as is known in the art.

The intermediate representation (IR) of the extracted text is presented to a multi-phased classifier that classifies items of text. The classification system uses three black box sub-classification systems, each taking as input the output of the previous classifier and improving on it. These include a content classifier 35, a context classifier 36, and a visual style classifier 37. These may be Naïve Bayes classifiers, primarily since they do not require scalar features. Some embodiments, however, may use other types of classifiers.

The various tokens and their final classifications are stored in a database 13. At some later time, the tokens may be retrieved into the memory for display on a video display 38. In response to receiving input from a user interface 39, the displayed tokens may be reclassified and saved again to the database 13.

The URL classifier 32 attempts to predict whether a crawled link is a relevant document, such as a candidate menu, without looking into the content of the link. The purpose of this classifier is to reduce the number of links for which a deeper semantic examination is required. To create this classifier, various embodiments may use a generative supervised learning approach, such as naive Bayesian learning, a Support Vector Machine classifier, or another classifier known in the art.

A URL is parsed to locate terms of interest to the given application, without actually analyzing the content of the associated document. For a menu feature extraction application, terms may include semantic words like "menu", "breakfast", "lunch", "dinner". Terms may also relate to a file extension type, such as ".html", ".pdf", or ".jpg". Other HTTP information, such as a content size or a link description, also may be analyzed to determine whether the content is relevant. This protocol classifier may be trained, for example, on a manually curated collection of pre-classified URLs. Obvious variations of such a classifier to cover other protocols, such as FTP, NNTP and the like, are also contemplated.

It will be appreciated that FIG. 3 is a functional figure; the machine classifier 30 may be implemented in any effective physical manner. Thus, the processes described above may be executed on a single computer, or on a plurality of computers in a cloud-based arrangement. A single network connection may service multiple URL classifiers, memories, content classifiers, context classifiers, or visual style classifiers. The numbers and locations of the classifiers may be determined statically based on application, or dynamically based on real-time demand. Moreover, there may be one database 13 or a plurality of distributed databases for storing features and scores. The storage system 34 may be a single memory or a plurality of memories distributed throughout a data network. A plurality of video displays 38 and user interfaces 39 may be paired to each other in a processing center for human reclassification. A person having ordinary skill in the art of distributed functional design may see other obvious variations that implement an embodiment of the invention.

A primary function of an embodiment of the invention is to extract useful textual information from what may be otherwise unstructured documents, such as images, and classify the text for subsequent processing. Textual classes are chosen on an application-specific basis. If the application is processing restaurant menus, then the textual classes for tokens may include, for example: Menu Name, Section, Subsection, Section Text, Item Name, Item Description, Item Price, Item Options, and Notes. In the particular example of FIG. 4, Sections include "Appetizers", "Pasta", and "Entrees". Item Names include "BBQ Duck", "Manicotti", and "Lamb Chops". One Item Description is "Bacon wrapped BBQ duck breast, served over a bed of sautéed mustard cabbage". Item Prices include "10", "17", and "26". Item Options may include how well a meat dish is cooked (not shown in FIG. 4). Notes include "Dessert Selection To Be Announced By Your Server". As can immediately be understood, the textual classes are application-specific, and even within a given application such as menu feature extraction, the textual classes themselves may vary from one input document to the next.

Figure 5:
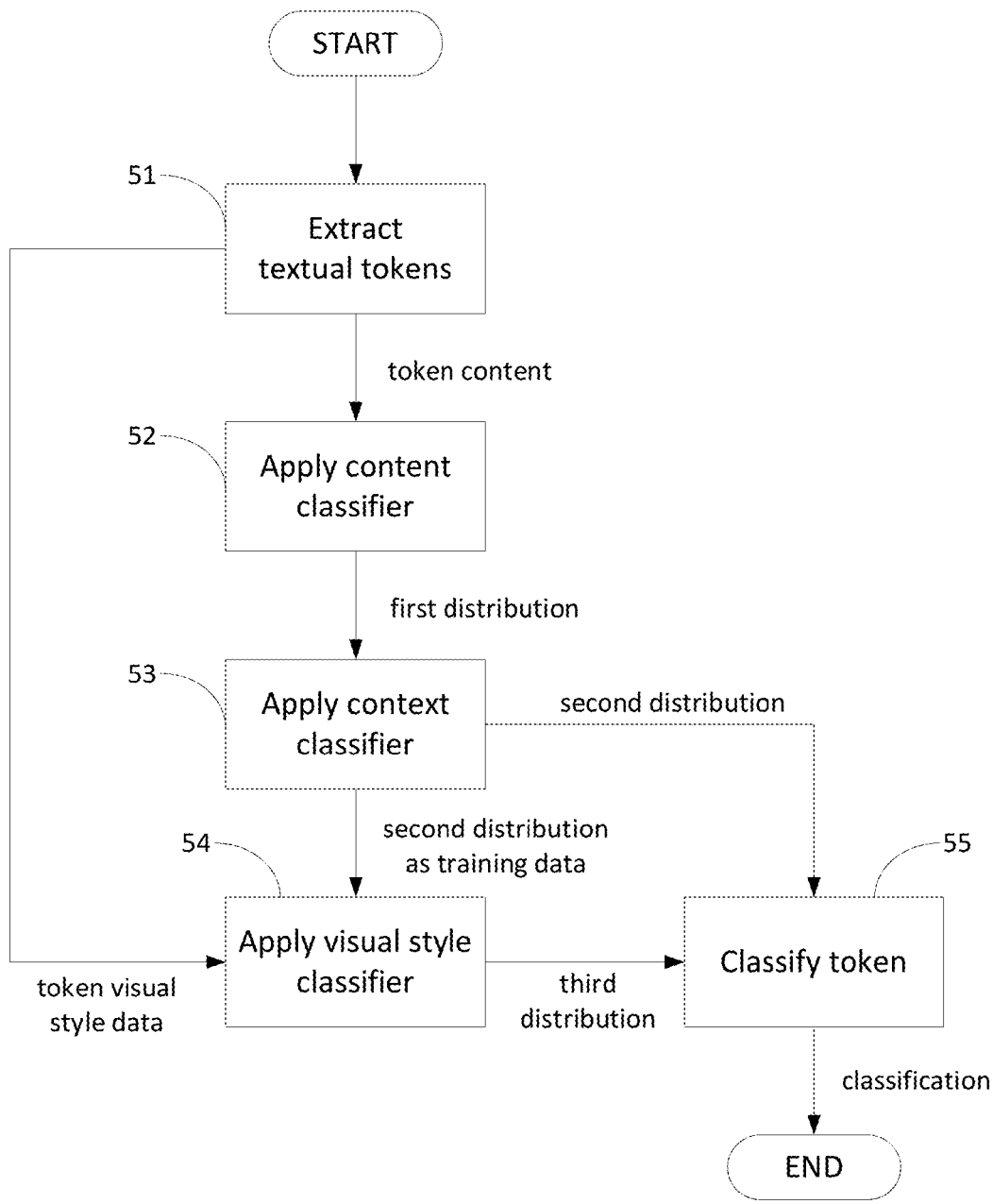
FIG. 5 is a flow diagram of a method of machine classifying text found in an input document.

FIG. 5 is a flow diagram of a method of classifying text found in an input document. The method begins with a first computer process 51 that involves extracting a plurality of textual tokens from the input document. Each extracted token has a visual style. For HTML pages and other markup language input documents, this process includes parsing the markup language to extract the textual contents. For other cases, such as image sources, this process includes column detection and optionally perspective correction, super-sampling, and OCR. For example, in a restaurant menu context, input documents of whatever source format are translated into a structured price-list schema and stored as an intermediate representation (IR) that captures both textual style and content. Such an IR may be, for example, HTML+CSS or other easily manipulable data storage format.

The method continues in a second computer process 52, that involves applying a content classifier to the plurality of textual extracts to produce, for each token, a preliminary probability distribution of the token with respect to the textual classes. The content classifier looks at each token of text independently to generate an initial classification based on the token content. For example, a token between an Item Name and an Item Price is likely to be an Item Description. Therefore, this intermediate token will have a probability distribution having a high probability associated with the Item Description class and lower probabilities associated with the other classes. The sum of probabilities across all textual classes should equal 1.0 for every token, because the token must fall within some textual class.

Tokens themselves may be formed from several words of text, and their properties such as length, any special characters (like a dollar sign), and whether they match a regular expression may be used to classify them. The content classifier may be implemented as a Bayes filter that is trained on a corpus of pre-classified tokens. In particular, the training data are tokens that are not known to be in the given input document. It is therefore expected that at least some of the training data will not be found in the input document. This content classifier typically provides about 70% to 75% accuracy.

The method continues in a third computer process 53, that involves redistributing the probabilities of each token based on the classification of its surrounding tokens. This classifier looks at each token in the context of its surrounding tokens, on the theory that tokens of like textual class should occur near each other. This context pass takes into account a local neighborhood around each token as determined by the content classifier. However, it looks only at the classification probabilities of neighboring tokens, not their actual content. Thus, the context classifier may combine the textual features determined by the content classifier for a given token with the textual features of a number of surrounding tokens to reclassify the given token. This improves the accuracy of the overall probability distribution. The context classifier may be implemented as another Bayes filter that is trained on the output of the content filter, as applied to the content filter training data. Like the content classifier, the context classifier may be trained on data found outside the input document.

The method proceeds to a fourth computer process 54, in which an embodiment applies a visual style classifier to each token based on its visual style. The result of this process is a third probability distribution that complements that produced in process 53 by the context classifier. Visual style features including font characteristics, spacing, text justification and so on are used to classify tokens.

The visual style classifier is trained on the output of the context classifier with respect to only the input document, rather than from a pre-defined corpus. One advantage of this approach is that, as noted above, even within a given application such as restaurant menu processing, each different input document may have different visual styles for similar textual classes. For example, one menu may show Sections in 18 point bold text, while another menu shows its Sections in 16 point italic text.

For any given application, input documents may encode useful classification information in their visual presentations, but this information is not easily extractable for the above reasons. Various embodiments of the invention therefore take advantage of the fact that a preliminary probabilistic distribution of tokens into classes is available, by training a visual style classifier to extract useful style information. In this way, illustrative embodiments attempt to learn the style of the input document based on the previous context classification. The style classifier therefore classifies each token based on the visual styles found in the input document, and does not classify any token based on a visual style that is not found in the input document.

Once training is complete, the visual style classifier uses that profile to reclassify the same input document based on the token visual style data, as shown in the Figure. If the prior steps correctly classify most tokens in the document (i.e., they assign the highest probability to the "correct" textual class), then illustrative embodiments can determine with a high probability which visual styles correspond to which textual classes. By learning the style of an input document, the visual style classifier can correctly interpret most or all of the rest of the document, thereby providing an even higher probability than in the prior art that the ultimate classification is correct.

The visual style classifier does not look at the content of the tokens. Instead, the classifier analyzes the visual style of the tokens (e.g., font-weight, color, amount of surrounding white space, CSS class name, and so on). Moreover, when the original input is an HTML page, this classifier does not look at the tag hierarchy of the page, because it operates just on the substantive tokens and their styles. This fact allows the classifier to operate efficiently on non-HTML based inputs.

The method concludes with a computer process 55 that determines a machine classification of the given token as a function of the second and third probability distributions. The final classifier assigns, to each token, a set of relative likelihoods that the token belongs to a given textual class. The relative likelihood is given by the formula:

$$RL = C^* S^4$$

where C is the probability, obtained from the context classifier, that the token has the given class, and S is the probability, obtained from the visual style classifier, that the token has the given class. In this way, the style classifier is given more weight in the final classification. However, if the style classifier does not produce a strong result (for example, if two textual classes appear in the input document with the same visual style), then the context classifier results will likely determine the final classification of the given token. It will be understood that the relative likelihood formula above is exemplary only, and that different formulae may be used for different applications.

Supervisory Manual Classification

Despite the excellent results obtainable from the machine classifier described herein, it is sometimes necessary to provide for human reclassification. An additional important component of the classification process therefore revolves around preparing the document such that it can be augmented or corrected by human computation (e.g., Amazon's Mechanical Turk system or oDesk workers). The burgeoning field of human computation represents a shift in traditional computer science processes by providing a framework for outsourcing certain computational steps to humans. This shift enables computer systems to solve problems that are otherwise computationally hard using algorithms alone. In a system embodiment of the present invention, misclassifications derived from the machine learning component are easy to fix by minimally trained human classification workers.

The Human Intelligence Task (HIT) model, found in such systems as the Mechanical Turk, relies on non-trained humans to perform the tasks. Because no training is needed for the tasks, no training is needed for the verification of the work and verification can thus be done as new HITs. Numerous tasks however might require an assisted learning phase comprising training by humans familiar with the desired outcome of the task. This training is also required of the reviewer of the output of the task.

To create a system for tasks that involve training we distinguish two categories: human workers and human verifiers. Verifiers also potentially act as recruiters and trainers and have previously been workers themselves. Because verifiers also perform recruiting duties, and financial compensation is contingent upon completion of a verified task, verifiers cannot have been the recruiter of the worker performing the task themselves to prevent agency problems. This precaution is added as these online task systems are low trust systems with difficult to enforce accountability.

Figure 6:
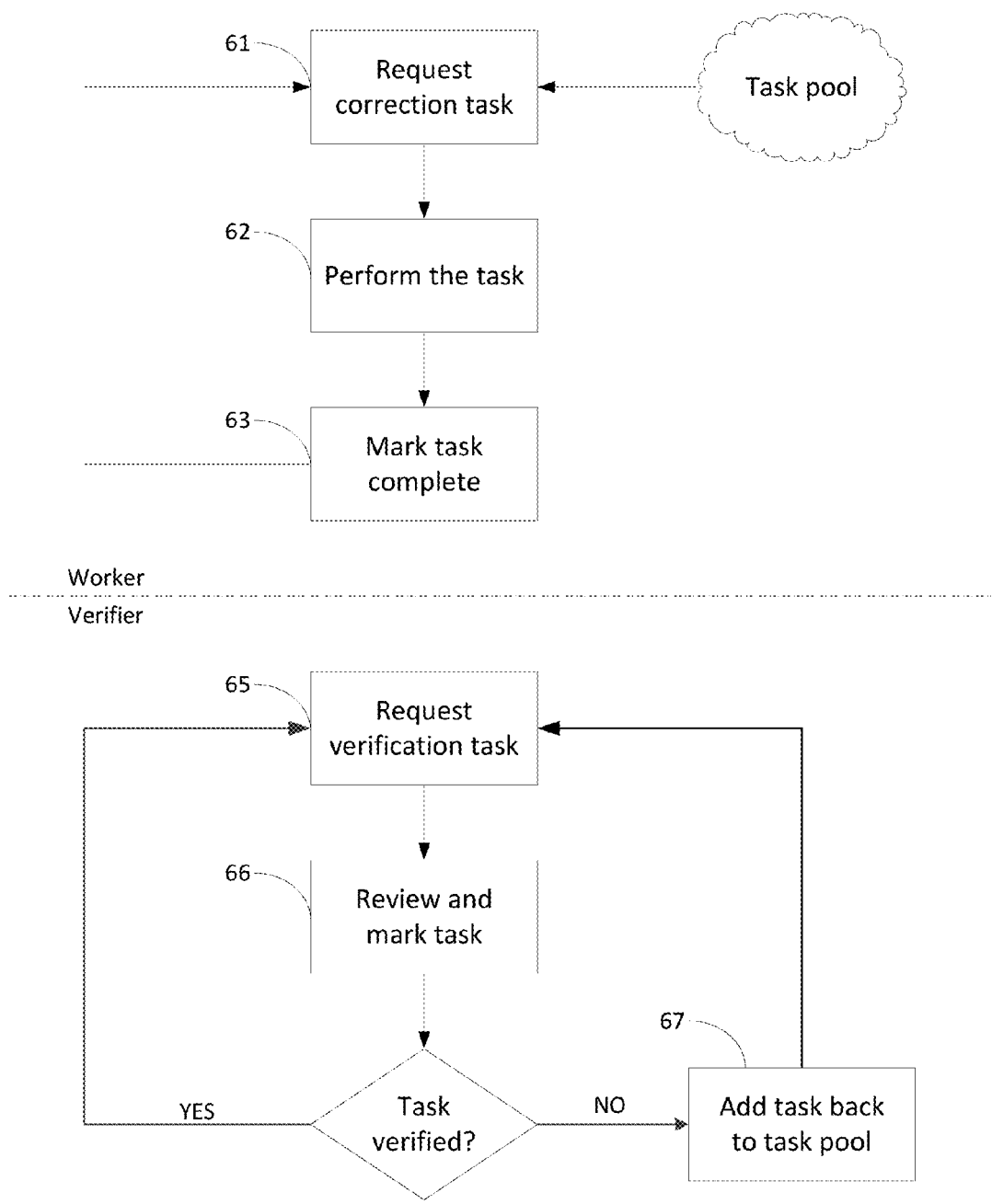
FIG. 6 is a flow diagram of a work/verification cycle in accordance with an embodiment of the invention.

In accordance with these observations, FIG. 6 is a flow diagram of a work/verification cycle in accordance with an embodiment of the invention. The top half of the Figure relates to processes undertaken by a worker, while the bottom half relates to processes undertaken by a verifier.

Typically, a worker will have a computer system on which he may do work. The computer system may be different from the machine classifier systems 12, 30, or it may be the same. In either case, in process 61, a worker requests a new token-correction task. This request may be made in accordance with techniques known in the art. In process 62, he receives task data and performs the task, as described below in connection with FIG. 7. In process 63, the worker marks the task complete using any appropriate technique known in the art, and returns to process 61 to request another correction task.

In process 65, a verifier requests a verification task. He receives a task from a worker that he did not recruit personally. In process 66 he reviews the task and either marks it complete or incomplete based on the results of his review. If the task is not verified complete, in process 67 the verifier leaves a comment explaining why the task is incomplete and returns it to the worker's task pool. At a later time, the worker picks up this task from the list of incomplete tasks when executing process 61, and completes it following the instructions on the attached comments. If the task is verified complete, the verifier returns to process 65 and requests another verification task.

The verification cycle can take place several times before the verifier deems the work performed up to standard and marks the task complete himself Upon completion, the worker and verifier accrue some benefit representing compensation for the completed task. The oversight needed in this type of system is minimal. It involves doing the initial hiring and training of workers and promoting a few to recruiter/verifier status. From that point the system can scale to hundreds of workers with little supervision. It is a scalable system to process learned HIT. By recording any changes performed by the human workers, the efficacy of the classification can be improved by creating an active feedback loop to the classification engine such that it continuously learns from past mistakes.

Once classified, an intermediate representation (IR) is converted to a human readable textual representation encoded using a lightweight markup language. This language allows humans to relatively easily construct and edit structured price list data with very little markup. This textual representation is then edited by a human to vet and correct any mistakes made by the classifier. It is then converted back to the IR and saved as a ground truth for training the content and context classifiers. Machine learning techniques further learn the edits to minimize automated errors in future revisions to the unstructured data.

Figure 7:
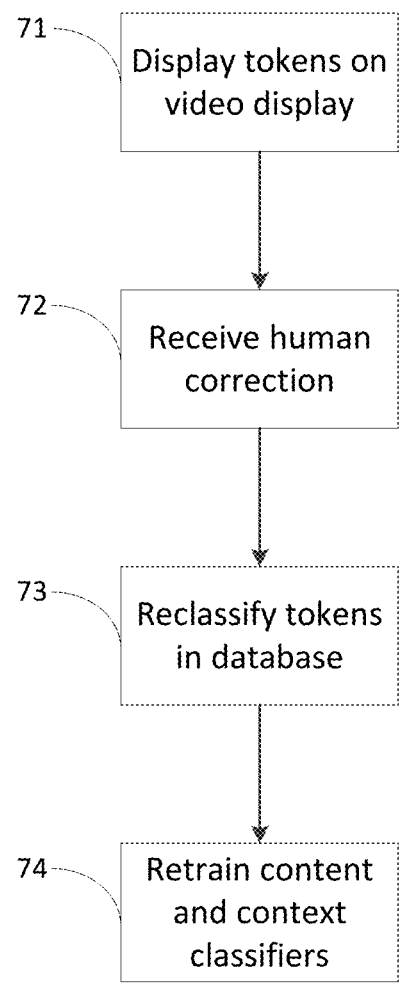
FIG. 7 is a flow diagram of processes that occur during human reclassification of machine-classified tokens in accordance with an embodiment of the invention.

FIG. 7 is a flow diagram of processes that occur during human reclassification of machine-classified tokens in accordance with an embodiment of the invention. In particular, in a process 71, machine-classified tokens are retrieved from a database and displayed on a video display, such as display 38 of FIG. 3, or more generally a video display in front of the worker. These tokens are displayed using a lightweight markup language, as described in more detail below in connection with FIG. 8. Next, in process 72, the worker's computer receives a human correction. This correction may be made, for example, when the worker edits the markup. Such edits may be facilitated by displaying the tokens in a token editor, which may be a text editor or an HTML editor. In process 73, the correction is applied to reclassify one or more tokens in the database. Reclassification may be accomplished by executing a database update command as known in the art. Finally, in process 74, the content and context classifiers are retrained, using the new "ground truth" identified by the manual reclassification of the token(s). Retraining of classifiers, especially Bayesian classifiers, is known.

The process for displaying tokens and making edits requires a display that is easily comprehensible and editable. This display is accomplished with a lightweight markup language. Many lightweight markup languages exist today (e.g., asciidoc, creole, and txt2tags). These languages were originally used on text-only displays, which could not display characters in italic or bold. Accordingly, informal methods were developed to convey such information. Special markup characters, such as * and "_", can be used around words to indicate bold and italic styling. Today, lightweight markup languages are used in applications where people need to easily read a styled document while it is being edited using a simple text editor. Such languages are used to represent general documents such as blogs, wiki contents, and general web pages.

Illustrative embodiments create a lightweight markup language to specifically target price lists, rather than general documents. By doing so, in addition to using markup characters to semantically tag text, this language can use context to infer text semantics. The language has been designed so that it can be used to both edit price lists that are both entered by a human, and to easily fix incorrect classifications made by the automated classifier. To this end, it uses per-line prefix-based markup that defines the classification of the line of text following the markup.

FIG. 8 provides an example of a price list written in the language. Each line represents a unique item of text in the price list. Lines can be prefixed with markup characters to specify a tagging. For example, price list names are specified with an "=" character prefix, while section headers use two "=" characters. Comments (or text to ignore) are specified with at "#" prefix. Section text is specified with a "%" prefix. For simplicity, price list item text does not need markup characters and the correct tagging is instead inferred from context.

Each price list item appears with a new line character between any other. The first line in the item is tagged as the title or name of the item. Subsequent lines are tagged as the description of the item. These lines are optional. The final line without markup (which is also optional) is tagged as the price of the item. It must be a single real number. Words followed by colons as markup are for rare classifications. For example, "choose:" can be used to specify options for a particular item, or for all items within a section if included directly under a section header.

Other embodiments may use different characters to accomplish the same functions. Moreover, some embodiments may have varying schemes to form a machine readable structured document that is simple to manually change and read. Discussion of the exact specifics of the markup language herein is but one of a variety of different potential implementations.

Various embodiments of the present invention may be embodied in many different forms, including, but in no way limited to, computer program logic for use with a processor (e.g., a microprocessor, micro controller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Additional embodiments of the present invention are listed hereinafter, without limitation. Some embodiments provided for below are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

What is claimed is:

1. A method of forming a structured document from an unstructured input document, the method comprising:
   receiving the input document from a data communication network;
   storing the received input document in a storage system;
   in a first computer process, extracting a plurality of textual tokens from the input document, each extracted token having a visual style;
   in a second computer process, applying a content classifier to the plurality of tokens to produce, for each token therein, a first probability distribution of the given token with respect to a plurality of textual classes, the first probability distribution comprising a plurality of first probabilities each associated with a corresponding textual class of the plurality of textual classes such that each textual class has one of the plurality of first probabilities associated therewith, each of the plurality of textual classes being:
      related to information conveyed by the textual tokens; and
      specific to a type of unstructured data items of the input document;
   in a third computer process, applying a context classifier to each token to redistribute the first probability distribution of each token, based on the textual class having the highest first probability of the token's surrounding tokens in context, thereby producing a second probability distribution of the given token with respect to the plurality of textual classes, the second probability distribution comprising a plurality of second probabilities each associated with a corresponding textual class of the plurality of textual classes such that each textual class has one of the plurality of second probabilities associated therewith;
   in a fourth computer process, applying a visual style classifier to each token based on its visual style and the second probability distribution, and not based on a corpus containing any visual style that is not found in the input document, thereby producing a third probability distribution of the given token with respect to the plurality of textual classes, the third probability distribution comprising a plurality of third probabilities each associated with a corresponding textual class of the plurality of textual classes such that each textual class has one of the plurality of third probabilities associated therewith;
   determining a classification for each token into one of the plurality of textual classes as a function of the second and third probability distributions; and
   in the storage system, forming a structured document from the plurality of classified tokens.

2. A method according to claim 1, wherein the input document comprises an image, and extracting the plurality of textual tokens comprises detecting a column in the image, optionally correcting the perspective of the image, supersampling the image, or performing optical character recognition on the image.

3. A method according to claim 1, wherein the visual style includes one or more of the group consisting of: font name, font family, font weight, font size, text color, vertical alignment, horizontal alignment, text justification, text indentation, capitalization type, link type, amount of surrounding white space, and CSS class name.

4. A method according to claim 1, wherein the style classifier does not classify any token based on a visual style that is not found in the input document.

5. A method according to claim 1, wherein the input document is an HTML page, and the style classifier does not classify any token based on a relationship between HTML tags.

6. A method according to claim 1, further comprising:
displaying the tokens on a video display;
receiving an indication from an individual viewing the video display that a token has been misclassified; and
reclassifying the token into a different textual class according to the indication.

7. A method according to claim 1, wherein the input document comprises a restaurant menu.

8. A non-transitory computer readable medium on which is stored program code for forming a structured document from an unstructured input document, the program code comprising:
program code for receiving the input document from a data communication network;
program code for storing the received input document in a storage system;
program code for extracting a plurality of textual tokens from the input document, each extracted token having a visual style;
program code for applying a content classifier to the plurality of tokens to produce, for each token therein, a first probability distribution of the given token with respect to a plurality of textual classes, the first probability distribution comprising a plurality of first probabilities each associated with a corresponding textual class of the plurality of textual classes such that each textual class has one of the plurality of first probabilities associated therewith, each of the plurality of textual classes being related to information conveyed by the textual tokens;
program code for applying a context classifier to each token to redistribute the first probability distribution of each token, based on the textual class having the highest first probability of the token's surrounding tokens in context, thereby producing a second probability distribution of the given token with respect to the plurality of textual classes, the second probability distribution comprising a plurality of second probabilities each associated with a corresponding textual class of the plurality of textual classes such that each textual class has one of the plurality of second probabilities associated therewith;
program code for applying a visual style classifier to each token based on its visual style and the second probability distribution, thereby producing a third probability distribution of the given token with respect to the plurality of textual classes, the third probability distribution comprising a plurality of third probabilities each associated with a corresponding textual class of the plurality of textual classes such that each textual class has one of the plurality of third probabilities associated therewith;
program code for determining a classification for each token into one of the plurality of textual classes as a function of the second and third probability distributions; and
program code for forming a structured document from the plurality of classified tokens in the storage system.

9. A medium according to claim 8, wherein the input document comprises an image, and the program code for extracting the plurality of textual tokens comprises program code for detecting a column in the image, optionally correcting the perspective of the image, super-sampling the image, or performing optical character recognition on the image.

10. A medium according to claim 8, wherein the visual style includes one or more of the group consisting of: font name, font family, font weight, font size, text color, vertical alignment, horizontal alignment, text justification, text indentation, capitalization type, link type, amount of surrounding white space, and CSS class name.

11. A medium according to claim 8, wherein the program code for the style classifier does not classify any token based on a visual style that is not found in the input document.

12. A medium according to claim 8, wherein the input document is an HTML page, and the program code for the style classifier does not classify any token based on a relationship between HTML tags.

13. A medium according to claim 8, further comprising:
program code for displaying the tokens on a video display;
program code for receiving an indication from an individual viewing the video display that a token has been misclassified; and
program code for reclassifying the token into a different textual class according to the indication.

14. A medium according to claim 8, wherein the input document comprises a restaurant menu.

15. A system for forming a structured document from an unstructured input document, the system comprising:
a network connection that is configured to receive the input document from a data communication network, the input document being made available at a network address on the data communication network;
one or more computers in electronic communication with the data communication network;
a network address classifier present on various ones of the one or more computers and configuring the various ones of the one or more computers to determine whether data retrieved from the network address is possibly relevant to a plurality of textual classes;
a translator present on various ones of the one or more computers and configuring the various ones of the one or more computers to extract a plurality of textual tokens from the input document, each extracted token having a visual style;
a storage system for storing the extracted textual tokens and their visual styles;
a content classifier present on various ones of the one or more computers and configuring the various ones of the one or more computers to produce, for each token, a first probability distribution of the given token with respect to the plurality of textual classes, the first probability distribution comprising a plurality of first probabilities each associated with a corresponding textual class of the plurality of textual classes such that each textual class has one of the plurality of first probabilities associated therewith, each of the plurality of textual classes being related to information conveyed by the textual tokens;
a context classifier present on various ones of the one or more computers and configuring the various ones of the one or more computers to redistribute the first probability distribution of each token, based on the textual class having the highest first probability of the token's surrounding tokens in context, thereby producing a second probability distribution of the given token with respect to the plurality of textual classes, the second probability distribution comprising a plurality of second probabilities each associated with a corresponding textual class of the plurality of textual classes such that each textual class has one of the plurality of second probabilities associated therewith; and a visual style classifier present on various ones of the one or more computers and configuring the various ones of the one or more computers to produce, for each token based on its visual style and the second probability distribution, a third probability distribution of the given token with respect to the plurality of textual classes, the third probability distribution comprising a plurality of third probabilities each associated with a corresponding textual class of the plurality of textual classes such that each textual class has one of the plurality of third probabilities associated therewith;

wherein each textual token is classified into one of the plurality of textual classes as a function of the second and third probability distributions.

16. A system according to claim 15, wherein at least one of the network address classifier, content classifier, and context classifier is implemented as a Bayesian filter.

17. A system according to claim 15, wherein the visual style classifier is configured to be trained on the second probability distribution.

18. The system according to claim 15, wherein the input document comprises an image, and the translator configures the various ones of the one or more computers to detect text in the image and extract the text as one or more of the plurality of textual tokens.

19. The system according to claim 15, wherein the input document is an HTML page, and the visual style classifier does not process the tag hierarchy of the HTML page to determine the third probability distribution.

20. The method of claim 1, wherein the classification (RL) of each of the plurality of tokens is determined from the second probability (C) and the third probability (S) of the token according to the function: $RL=C*S^4$.

* * * * *